United States Patent [19]

Memeger, Jr.

[11] Patent Number: 5,399,662
[45] Date of Patent: Mar. 21, 1995

[54] STRONG NON-IONIC BASE CATALYZED RING OPENING POLYMERIZATION OF LACTAMS

[75] Inventor: Wesley Memeger, Jr., Wilmington, Del.

[73] Assignee: E. I. Du Pont de Nemours and Company, Wilmington, Del.

[21] Appl. No.: 168,894

[22] Filed: Dec. 17, 1993

[51] Int. Cl.⁶ .................. C08G 69/14; C08G 73/10
[52] U.S. Cl. .................. 528/310; 528/321; 528/322; 528/323
[58] Field of Search ............ 528/310, 321, 322, 323

[56] References Cited

U.S. PATENT DOCUMENTS 2,805,214  9/1957  Zimmerman ............... 528/312
3,236,817  2/1966  Zimmerman ............... 528/315

OTHER PUBLICATIONS

Tang, J. S. et al., *Angew. Chem. Int. Ed. Engl.*, 32(6), 896, 1993.
Pietzonka, T. et al., *Angew., Chem. Int. Ed. Engl.*, 32(5), 716, 1993.
Tang, et al., *Tetrahedron Letters*, 34, 2903–2904, 1993.
Tang, et al., *J. Am. Chem. Soc.*, 115, 5015–5020, 1993.

*Primary Examiner*—Nathan M. Nutter
*Assistant Examiner*—Shelley A. Dodson

[57] ABSTRACT

Process for the ring opening polymerization of lactams to higher molecular weight polyamide polymers utilizing non-ionic polymerization catalyst base with a pKa of equal to or greater than 30, particularly certain strong, nitrogen and phosphorus containing non-ionic bases.

21 Claims, No Drawings

STRONG NON-IONIC BASE CATALYZED RING OPENING POLYMERIZATION OF LACTAMS

FIELD OF THE INVENTION

This invention concerns a process for the ring opening polymerization (ROP) of lactams to high molecular weight polyamide polymers by strong nitrogen and phosphorus containing non-ionic bases.

BACKGROUND OF THE INVENTION

U.S. Pat. No. 2,805,214 discloses the ring opening polymerization of ε-caprolactam with the use of a strong ionic base catalyst comprising an alkali metal hydroxide together with an alkali metal, alkali metal amide or alkali metal hydride.

U.S. Pat. No. 3,236,817 discloses the ring opening polymerization of ε-caprolactam with the use of strong ionic base catalysts comprising an alkali metal or alkali metal hydride and alkaline earth metals or alkaline earth metal hydrides.

J-S. Tang and J. G. Verkade, Angew., Chem. Int. Ed. Engl., 32, 896 (1993) disclose the use of phosphazene bases in the conversion of isocyanates to isocyanurates.

T. Pietzonka and D. Seebach, Angew., Chem. Int. Ed. Engl., 32, 716 (1993) report the use of $P_4$-phosphazene base as a metal free initiator system for the anionic polymerization of methyl methacrylate.

SUMMARY OF THE INVENTION

This invention provides a process for the ring opening polymerization ("ROP") of lactams that comprises contacting a lactam with a non-ionic polymerization base catalyst whose conjugate acid has a $pK_a$ of equal to or greater than 30 to form a polyamide. It further provides a process using as polymerization catalyst phosphazene base of the structure

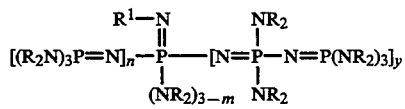

where $R^1$ is $C_1$ to $C_8$ branched or linear alkyl, and R is $CH_3$ or both R's together are —$(CH_2)_4$— and m, n, and y are independently selected from the group consisting of the integers 0–3.

DETAILED DESCRIPTION OF THE INVENTION

The invention relates to a process for the ring opening polymerization of lactams, using as catalysts strong nitrogen and phosphorus containing non-ionic bases.

By lactams is meant cyclic amides produced by the reaction of amine groups with carboxylic acid groups with the removal of one molecule of water. The process of this invention is particularly applicable to intramolecular lactams of $C_4$ to $C_{12}$, e.g., ε-caprolactam ($C_6$) and enantholactam ($C_7$), and to bimolecular lactams having from 10 to 26 membered rings such as the 10-membered ring cyclic lactam formed from one molecule of succinic acid reacted with one molecule of 1,4-butanediamine; the 14-membered ring cyclic lactam formed from one molecule of adipic acid reacted with one molecule of hexamethylenediamine; the 26-membered ring cyclic lactam formed from one molecule of 1,12-dodecanedioic acid reacted with one molecule of 1,12-dodecanediamine; the 12-membered ring cyclic lactam formed from one molecule of succinic acid reacted with one molecule of hexamethylene diamine and the higher cyclic analogs of either intramolecular lactams or bimolecular lactams. Utilizing the process of this invention, ε-caprolactam forms the product nylon 6; enantholactam forms the product nylon 7; and the 14-membered-ring cyclic lactam forms the product nylon 6, 6.

The process of the present invention is catalyzed by strong, nitrogen- and phosphorous-containing non-ionic bases. The catalysts or initiators which are effective in the practice of this invention include non-ionic bases with a pKa of equal to or greater than 30. Examples of non-ionic bases which are useful in the practice of this invention include polyaminophosphazenes and those described by Tang et al., Tetrahedron Letters 34, 2903–2904 (1993) and Tang et al., J. Am. Chem. Soc. 115, 5015–5020 (1993). Preferred non-ionic bases are phosphazene bases of the structure

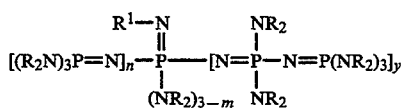

where $R^1$ is ($C_1$–$C_8$) alkyl wherein when alkyl is greater than $C_3$ it is branched or linear, and R is Me or both R's together are —$(CH_2)_4$—, and m, n, and y are independently 0–3 or preferably as defined below for the specific phosphazene $P_x$ (x=1 to 7) bases. Preferred $R^1$ groups include t-butyl, t-heptyl (—C $(CH_3)_2$ C$(CH_2)_3$) and t-octyl (—C$(CH_3)_2$CH$_2$C$(CH_2)_3$). Preferred R's are methyl and —$(CH_2)_4$—.

The number of phosphorus atoms present in a molecule of the specific phosphazene base of the present invention is defined as $P_x$ wherein x is selected from the integers 1 to 7 (see Table I below).

TABLE I

| Base | m | n | y |
|---|---|---|---|
| $P_1$ | 0 | 0 | 0 |
| $P_2$ | 1 | 1 | 0 |
| $P_3$ | 2 | 2 | 0 |
| $P_4$ | 3 | 3 | 0 |
| $P_5$ | 3 | 2 | 1 |
| $P_6$ | 3 | 1 | 2 |
| $P_7$ | 3 | 0 | 3 |

The preferred bases have $^{MeCN}pK_{HB}+ > 30$ and are the $P_2$ to $P_7$ type where R and $R^1$ are as defined above.

The more preferred bases are the $P_3$ to $P_7$ type with a $^{MeCN}pK_{HB}+ = $ or $> 38$ (see Table II below).

TABLE II

| Base | $R^1$ | R | m | n | y | $MeCN_pK_{BH+}$ |
|---|---|---|---|---|---|---|
| $P_{1\text{-}t\text{-}BU}$ | t-Bu | Me | 0 | 0 | 0 | 26.9[1] |
| $P_{2\text{-}Et}$ | Et | Me | 1 | 1 | 0 | ca 33[1*] |
| $P_{2\text{-}t\text{-}Bu}$ | t-Bu | Me | 1 | 1 | 0 | ca 33.5[1] |
| $P_{3\text{-}t\text{-}Bu}$ | t-Bu | Me | 2 | 2 | 0 | 38.6[1] |
| $P_{4\text{-}t\text{-}Bu}$ | t-Bu | Me | 3 | 3 | 0 | 42.6[1] |
| $P_{4\text{-}t\text{-}Oct}$ | t-Oct | Me | 3 | 3 | 0 | 41.2[2] |
| $P_{5\text{-}t\text{-}Bu}$ | t-Bu | Me | 3 | 2 | 1 | ca 45.6[1] |
| $P_5$P-t-Bu | t-Bu | —$(CH_2)_4$— | 3 | 2 | 1 | ca 47[1] |
| $P_{7\text{-}t\text{-}Bu}$ | t-Bu | Me | 3 | 0 | 3 | ca 45.6[1] |

*The analogous $P_2$-t-Bu has a $MeCN_pK_{HB+} = h33.5$
[1]Schwesinger R.; Hasenfratz, C.; Schlempedr, Walz, L.; Peters, E-M.; Peters, K.; Schnering, H. Georg von; Angew. Chem. Int. Ed. Engl. 1993, 32, No. 9, 1361.
[2]Schwesinger, R. Nachr. Chem. Tech Lab. 1990, 38, 1214.

Preferred bases include $P_4$-t-Bu, $P_4$-Oct and $P_2$-Et, the more preferred base is $P_4$-t-Bu.

In carrying out the process, it is preferable to employ a temperature of: (i) cyclic unimer, at least melting temperature typically above 150° C., preferably 200°–275° C.; (ii) ε-caprolactam, at least 100° C., preferably 200°–275° C.

Once the polymerization starts, it goes rapidly, forming a high molecular weight polymer within a few seconds to a few minutes and the Examples are further illustrative of this. The peak molecular weight may be reached at approximately the same time as either the equilibrium monomer concentration is reached or the concentration of active catalyst is reduced to negligible proportions by the action of impurities or other chain terminating reactions. Subsequently, the increase in molecular weight and viscosity slows and gradually levels off. At higher temperatures, 240°–270° C. this attainment of peak molecular weight is rapid, almost complete in 30 minutes, but at lower temperatures such as 180°–230° C. is sufficiently slow that the control of molecular weight is relatively easy. In practice, it may be, as mentioned above, that at the time the peak viscosity is reached, the equilibrium extractables (e.g., starting material or low MW intermediates) content is not yet attained. In this case, it may be desirable to continue the polymerization to bring the extractables content closer to its equilibrium value, the procedure used depending on whether it is the molecular weight or extractables content which is more important for any particular application.

The concentration of catalyst is not critical, although it is generally more desirable to use as small a concentration as possible consistent with a given polyamide in order to obtain a high molecular weight product.

The reaction is conducted at pressures of from about 1 atm to about 100 atm (and 4 psi to 1400 psi). However, pressure is not a critical factor.

In accordance with this invention, solvents are not required, however, aprotic solvents can be tolerated. Suitable aprotic solvents include N-methyl-2-pyrollidinone, N-acetylmorpholine and dimethyl sulfoxide.

In accordance with this invention the atmosphere is preferably oxygen free and essentially moisture free, thus, it is preferable to carry out the process under a dry inert gas such as nitrogen or argon. Moisture tends to slow the reaction.

A further nonessential embodiment of this invention includes the use of a cocatalyst or facilitator such as N-acetyl-ε-caprolactum. The cocatalyst serves to increase the rate of reaction.

The process of the present invention can be used to prepare copolymers. This is accomplished by utilizing as starting material a mixture of lactams.

The polyamides formed by this process are useful for fibers, films, moldings, foams, and composites.

In the discussion and Examples the following abbreviations are used:

PMT = polymer melt temperature (see Sorenson et al., Preparative Methods of Polymer Chemistry, 2nd Ed., Interscience, New York, 1963, pp. 49–50)

DBU = 1,8-diazabicyclo[5.4.0]undec-7-ene $\eta_{inh}$ = inherent viscosity (see Sorenson et al., Preparative Methods of Polymer Chemistry, 2nd Ed., Interscience, New York, 1963, pp. 34–35)

Both the nylon 6 and nylon 66 polymers prepared by this invention yield fibers by drawing from a melt pool of the polymers on a gradient hot bar at or above the [PMT's]. The nylon 6 polymer from Example 5 was molded into a 1.91 cm diameter rod at a temperature of 190° C. and a pressure of 19.5 MPa. The rod was extruded on a press spinning apparatus at a ram pressure of 7.9 MPa and a melt temperature of 298° C. through a 380 μm diam.× 1140 μm length spinneret held at 312° C. The extrudate was wound up at 5 m/min onto a bobbin.

Lengths (8 to 10 cm) of the above as-spun filaments were drawn by hand over a hot pin (surface of 2 cm dia. heated cylinder) as follows with the accompanying fiber properties.

TABLE III

| Entry | Draw Ratio | Draw Stage | Temp. °C. | Denier | Tenacity g/denier* | Elong., % | Modulus, g/denier |
|---|---|---|---|---|---|---|---|
| 1 | 2 | 1 | 70 | 120 | 4.3 | 41 | 13 |
|   | 1.8 | 2 | 160 |   |   |   |   |
| 2 | 2.25 | 1 | 70 | 108 | 5.1 | 31 | 14 |
|   | 1.8 | 2 | 160 |   |   |   |   |
| 3 | 3 | 1 | 160 | 105 | 5.6 | 30 | 16 |

*To convert to dN/tex = decinewtons/tex (tex = wt in grams per 10,000 meters of fiber), multiply by 0.883.

The tensile properties quoted above represent typical properties for nylon 6.

EXAMPLES

Preparation of Polymers

Tables IV(a) and IV(b) exhibit Examples 1–8 of the ROP of ε-caprolactam using P4-t-Bu as a catalyst and the same with N-acetyl-ε-caprolactam as a cocatalyst. A comparison of Example 1 with 2 shows that although the induction time is relatively short at relatively high temperature (see Example 4 for a polymerization carried out at lower temperature), the reaction is speeded up appreciably when N-acetyl-ε-caprolactam is added. This is consistent with the formation of a stabilized caprolactam anion and for an anionic catalysis mechanism.

Characterization of Polymers

Structure. The $^1$H and $^{13}$C NMR spectra of the polymers were taken in hexafluoropropan-2-ol-$d_2$ and were found to be identical to authentic samples of nylon 6 via hydrolysis polymerization ε-caprolactam, and nylon 66 via catalyst free condensation of salt strike.

Inherent viscosities. The inherent viscosity [("$\eta_{inh}$")= In $(\eta_{rel})/c$.] values were determined at 30° C. at a concentration of 0.5 wt/v % in m-cresol and/or hexafluoropropan-2-ol (HFIP) according the procedure described in ref. 5.

EXAMPLE 1

Phosphazene P4-t-Bu Catalyzed Ring Opening Polymerization of ε-Caprolactam

To a 15-mL round-bottom 2 cm internal diameter cylindrical flask were added 2.26 g of ε-Caprolactam and 0.05-mL of 1 M (=0.05 m mole) phosphazene P$_4$-t-Bu (Fluka catalog no. 79421). The tube was evacuated at 25.4 cm of Hg vacuum for 10 min. to remove the hexane. The flask was equipped with a three-necked adapter, a glass shaft with paddle stirer blade and a drying tube then connected to a nitrogen line and a mechnical controller. The reactor was lowered into a 270° C. Woods metal bath. Stirring was begun and within a min. a clear melt was obtained which became very viscous within 5 min. and wrapped around the stirrer shaft. After a total of 20 min., the bath was lowered and the reaction product allowed to cool. The stirrer shaft was extracted from the flask and a yield of 1.95 g of a tough polymeric product was cut away using a razor blade. Another 0.25 g of polymeric product was recovered as a tough film from the bottom of the reaction flask. A portion of the sample (1.9 g) from the stirrer shaft was ground through a 20 mesh screen using a Wiley mill. The 1.89 g of product recovered was Soxhlet extracted with 100-mL of MeOH giving 1.65 g of an insoluble polymer fraction and 0.19 g of a soluble fraction consisting mainly of caprolactam. The isolated polymer yield translates to 85% had the total sample been extracted. The inherent viscosity was 1.89 (0.5% in m-cresol at 30° C.); and 2.57 in hexafluoroisopropyl alcohol. PMT-220° C. Fibers were pulled from the very viscous melt at 243° C.

COMPARATIVE EXAMPLE 1A

Thermal Ring Opening Polymerization of ε-Caprolactam

To a 15-mL round-bottom 2 cm internal diameter cylindrical flask was added 2.26 g of ε-Caprolactam. The flask was equipped with a three-necked adapter, a glass shaft with paddle stirrer blade and a drying tube then connected to a nitrogen line and a mechnical controller. The reactor was lowered into a 270° C. Woods metal bath. Stirring was begun and within a min., a clear melt was obtained. There was no change in viscosity noted over the next 2 h of heating. The caprolactam (1.6 g) was recovered unchanged. The remainder of the starting material was lost through evaporation.

EXAMPLE 2

Phosphazene P$_4$-t-Bu/N-acetyl-ε-Caprolactam cocatalyzed Ring Opening Polymerization of ε-Caprolactam To a 15-mL round-bottom 2 cm internal diameter cylindrical flask were added 2.26 g of ε-Caprolactam and 0.05-mL of 1 M (=0.05 m mole) phosphazene P$_4$-t-Bu (Fluka catalog no. 79421) and 0.01 g of N-acetyl-ε-Caprolactam. The tube was evacuated at 25.4 cm of Hg vacuum for 10 min. to remove the hexane. The flask was equipped with a three-necked adapter, a glass shaft with paddle stirer blade and a drying tube then connected to a nitrogen line and a mechnical controller. The reactor was lowered into a 270° C. Woods metal bath. Stirring was begun and within a min., a clear melt was obtained which then became very viscous within 2 min. and wrapped around the stirrer shaft. Heat was removed and the stirrer withdrawn pulling filmy fibers from the very viscous melt. The inherent viscosity of the isolated polymer was 1.63 (0.5% in m-cresol at 30° C.); and 1.74 in hexafluoroisopropyl alcohol.

COMPARATIVE EXAMPLES

In both Examples 1 and 2, high molecular weight polymers were obtained as measured by the $\eta_{inh}$'s. The $M_w/M_n$ of 99,600/25,500 was obtained for the polymer in Example 1.

Comparative Example 1a shows an attempt at the ROP of ε-caprolactam without catalyst which results in no polymer formation. Comparative Examples 1B and 1C show attempts at the ROP of ε-caprolactam using DBU and DBU/N-acetyl-ε-caprolactam, respectively, as catalysts. Only a very small amount of polymer was formed in these examples (4% conversion of ε-caprolactam was found in 1C). In Comparative Example 1D, the concentration of DBU was increased over two fold that used in Example 1C, but again, little polymer was formed.

EXAMPLES 9–14

Table V exhibits Examples 9–14 which exemplify the ROP of ε-caprolactam using other phosphazene base analogs of P$_4$-t-Bu as catalysts. Both P$_4$-t-Oct and P$_2$-Et give polymer with the former having activity in the same range as P$_4$-t-Bu whereas the latter was less reactive.

EXAMPLES 15–18

Table VI exhibits Examples 15–18 which exemplify the ROP of nylon 66 cyclic unimer containing a small amount of the cyclic dimer. The catalytic activity of the phosphazene bases P$_4$-t-Bu and P$_4$-t-Oct in the ROP in this larger macrocyclic lactam was similar to that for ε-caprolactam.

EXAMPLE 15

Phosphazene P$_4$-t-Bu Catalyzed Ring Opening Polymerization of Nylon 66 cyclic unimer/dimer (94/6)

To a 15-mL round-bottom 2 cm internal diameter cylindrical flask were added 2.26 g of nylon 66 cyclic unimer/dimer (94/6 mole ratio) and 0.05-mL of 1 M (=0.05 m mole) phosphazene P$_4$-t-Bu (Fluka catalog no. 79421). The tube was evacuated at 25.4 cm of Hg vacuum for 10 min. to remove the hexane. The flask was equipped with a three-necked adapter, a glass shaft with paddle stirer blade and a drying tube then connected to a nitrogen line and a mechnical controller. The mixture with stirring reactor was lowered into a 270° C. Woods metal bath. Within a min., a clear thin water white melt was obtained which noticeably increased in viscosity within the next 10 min. [Note: A few dark patches appeared on the wall of the reactor above the melt.] During the next 30 min., a further increase in melt viscosity was noted. After 2 h, the stirrer was pulled from the pale yellow viscous reaction mixture and allowed to cool whereupon it solidified within 30–60 s. The reactor was cracked by striking with a hammer and 1.91 g of a pale yellow plug was recovered. Another 0.34 g of material was recovered from the stirrer using a spatula. Fibers could be pulled from a melt pool of the above plug on a hot finger at 262° C. A 1.87 g portion of the above plug was ground and extracted with MeOH giving 1.38 g of polymer which translates to a conversion of 73% had the total sample from the reactor been extracted. The inherent viscosity was 0.70 (0.5% in m-cresol at 30° C.); and 1.05 in hexafluoroisopropyl alcohol. PMT 250° C. Long fibers were pulled from melt pool at 256° to 272° C. on a gradient hot bar.

EXAMPLE 19

Phosphazene P4-t-Bu Catalyzed Ring Opening Polymerization of Enantholactam

To a 15 mL round-bottom 2 cm internal diameter cylindrical flask were added 2.54 g of enantholactam (prepared as in D. D. Coffman et al., J. Polymer Science, 3, 85–94 (1948)), 0.032 g (0.05 mmol) of phosphazene P4-t-Bu (as purchased, Fluka catalog no. 79421, except the hexane removed prior to addition to the reaction mixture) and 0.01 g of N-acetyl-$\epsilon$-caprolactam. The flask was equipped with a three-necked adapter, a glass shaft with paddle stirrer blade and a drying tube then connected to a nitrogen line and a mechanical controller. The reactor was lowered into a 270° C. Woods metal bath. Stirring was begun and within 1 min., the clear melt which had formed initially became viscouse and began to climb the stirrer. After another 1 to 2 min. it had wrapped around the stirrer. The viscosity was so high at this point that melt flow was not evident. After 6 min. the Woods metal bath was lowered and the stirrer was removed with the polymer clinging tenaciously to it. The polymer adhering to the flask was also found to cling tenaciously. After grinding to the polymer to 20 mesh using a Wiley mill, Soxhlet extracting with MeOH, and drying, a yield of 2.17 g of polymer was obtained. A small amount (0.04 g) of enantholactam was recovered from the MeOH extracts following rotary evaporation. The polymer exhibited a PMT of 243° C. and gave drawable fibers from a melt pool on a gradient hot bar at 249° C. The inherent viscosity was 2.07 (0.5 wt. % in m-cresol at 30° C.).

TABLE IV(a)

P4-t-BU CATALYZED ROP OF $\epsilon$-CAPROLACTAM

| Ex. No. | $\epsilon$-Caprolactam g | N-Acetyl caprolactam g | P4-t-Bu (1M in hexane) mL (= m-mol) | Hexanoic acid µL | Temp. °C. | Time min | Comments |
|---|---|---|---|---|---|---|---|
| 1 | 2.26 | — | 0.05 | — | 270 | 0–5 | The clear water white melt wrapped around stirrer within 5 min. Slowed stirred to 12 rpms but melt remained on the stirrer. At 20 min. the melt was allowed to cool. |
| Comp. 1a | 2.26 | — | Ex. 1 Control | — | 270 | 2 h | No increase at all in melt viscosity. There was apprecible loss of caprolactam through evaporation. |
| Comp. 1b | 2.26 | — | DBU g 0.01 | — | 270 | 30 s | Clear thin melt. |
| | | | | | | 1.3 h | Remained a clear thin melt. Removed heat and cooled. DSC Tm indicates product was unreacted $\epsilon$-caprolactam. |
| Comp. 1c | 2.26 | 0.01 | DBU g 0.01 | — | 270 | 0–30 | In 1 min. melt was clear and thin. |
| | | | | | | 30 | Added 0.02 µL of DBU to the thin melt |
| | | | | | | 2.5 h | No change noted. |
| | | | | | | 3.5 h | Unchanged so heating discontinued. DSC of small amount of polymer isolated is consistent with nylon 6. |
| Comp. 1d | 2.26 | 0.010 | DBU 0.023 | — | 270 | 1–10 | Initially melt was clear water white and thin. |
| | | | | | | 3 h | Melt unchanged, Heating discontinued. |
| 2 | 2.26 | 0.01 | 0.05 | — | 270 | 2 | A clear melt was obtained, which became very viscous within 2 min. and wrapped around stirrer. Let cool. |
| 4 | 2.26 | — | 0.05 | — | 150 | 0–10 | At 1–10 min. the melt was clear and thin. |
| | | | | | 150–200 | 10–30 | No change in melt viscosity. |
| | | | | | 200–214 | 30–35 | At some point between 30 and 34 min. the melt became very viscous and warrped around stirrer. Droplets of caprolactam were on the wall above melt. |
| 5 | 22.6 | 0.050 | 0.25 | — | 270 | 2 | A very viscous partially translucent melt. |
| | | | | | | 5 | Clear melt on portion away from stirrer with translucent areas around stirrer. |
| | | | | | | 6 | The melt was clear and became very viscous. Stopped heating. Filmy fibrous material was formed as the stirrer was withdrawn. |
| 6 | 22.6 | 0.025 | 0.0625 | 8 | 270 | 1 | Initially clear thin melt, started to become viscous. |
| | | | | | | 2 | Hexanoic acid added through side arm. |
| | | | | | | 3 | Very viscous stringy melt began to wrap around stirrer. |
| | | | | | | 5 | Stirrer was raised and melt allowed to cool. |
| 7 | 2.26 | — | 0.05 | — | 270 | 30 s | Started to become viscous. Set temp. to 260. Noted bubbles in clear melt after stirrer was removed. |
| | | | | | 260 | 5 | Attained 260° C. |
| | | | | | 260 | 3 h | Clear melt with bubbles. |
| | | | | | 260 | 4 h | Removed from heat. |
| 8 | 2.26 | 0.010 | 0.053 | — | 270 | 7 | Translucent melt climbed stirrer. Stopped heating |

TABLE IV(b)

P4-t-BU CATALYZED ROP OF $\epsilon$-CAPROLACTAM

| Ex. No. | Yield g Before MeOH extraction | Yield g After MeOH extraction | Poly./Olig. % Conversion | $\eta$inh m-cresol/HFIP After MeOH extraction | PMT °C. Poly. | DSC $T_m$ °C. | DSC $\Delta H$ J/g |
|---|---|---|---|---|---|---|---|
| 1 | 2.2 | 1.9/— | 85 | 1.89/2.57 | 220 | 218 | 65 |

TABLE IV(b)-continued

$P_4$-t-BU CATALYZED ROP OF $\epsilon$-CAPROLACTAM

| Ex. No. | Yield g Before MeOH extraction | Yield g After MeOH extraction | Poly./Olig. % Conversion | $\eta$inh m-cresol/HFIP After MeOH extraction | PMT °C. Poly. | DSC $T_m$ °C | DSC $\Delta H$ J/g |
|---|---|---|---|---|---|---|---|
| | | | | | | (1st cycle) 212 | (1st cycle) 60 |
| | | | | | | (2nd cycle) | (2nd cycle) |
| Comp. 1a | 1.5 | 0.00/1.63 | 0 | | | | |
| Comp. 1b | 2.19 | 0/2.19 | 0 | | | 71.5 | 126 |
| Comp. 1c | 1.99 | 0.089/— | 4 | 0.54/— | | 210 | 91 |
| | | | | | | (1st cycle) 205 | (1st cycle) 89 |
| | | | | | | (2nd cycle) | (2nd cycle) |
| Comp. 1d | 2.22 | | | | | | |
| 2 | | | | 1.63/1.74 | | | |
| 4 | | 1.38/— | 62 | 3.34/3.22 | | 220 | 78 |
| | | | | | | (1st cycle) 213 | (1st cycle) 55 |
| | | | | | | (2nd cycle) | (2nd cycle) |
| 5 | 22.4 | 18.5/1.69 | 82 | 3.02/2.86 | PST >202, <227 | 218 | 60 |
| | | | | | | (1st cycle) | (1st cycle) |
| | | | | | PMT 227 | 215 | 62 |
| | | | | | | (2nd cycle) | (2nd cycle) |
| 6 | 11.3 | 8.6/1.8 | 77 | 2.10/2.28 | | 217 | 71 |
| | | | | | | (1st cycle) 216 | (1st cycle) 62 |
| | | | | | | (2nd cycle) | (2nd cycle) |
| 7 | 2.26 | 1.92/0.18 | 85 | 0.88/0.53 | | | |
| 8 | 2.28 | 2.01/0.12 | 89 | 2.24/2.30 | | | |

TABLE V(a)

Other Phosphazene Base Catalyzed ROP of $\epsilon$-Caprolactam

| Ex. No. | $\epsilon$-Caprolactam (Dist. 115–120° C./0.25 mm Hg) g | N-Acetyl caprolactam g | Phosphazene Base | Temp. °C. | Time min | Comments |
|---|---|---|---|---|---|---|
| 9 | 2.26 | 0.010 | $P_4$-t-Oct (1M in hexane) g (mmol) 0.0168 (0.0181) (Fluke Cat. No. 79422) | 270 | 1–8 | Clear melt with no viscosity increase. |
| | | | | | 9 | No change. |
| | | | | | 13 | No change. Temp. set to 260° C. |
| | | | | | 25 | Slight increase in melt viscosity at 260° C. A layer of bubbles were observed atop the melt. |
| | | | | | 35 | Unchanged. |
| | | | | | 2 h 35 min. | A definite viscosity increase noted. |
| | | | | | 4 h | Stopped heating somewhat dark thin clear melt. |
| 10 | 2.26 | 0.01 | 0.0336 (0.0362) | 270 | 7 | Translucent melt climbed stirrer. Stringy fibers formed when stirrer was extracted. Heating was stopped. |
| 11 | 2.26 | 0.010 | $P_2$-Et g (mmol) 0.0168 (0.05) (Fluke Cat. No. 79417) | 220 | 1 | Clear thin melt. |
| | | | | | 2 | Clear greenish yellow melt. |
| | | | | | 10 | No change. Temp. raised to 250° C. |
| | | | | | 20 | No change. Temp. raised to 260° C. |
| | | | | | 38 | No change. Temp. raised to 270° C. |
| | | | | | 65 m–18 h | The melt was non-viscous implying little polymerization had occurred. |
| 12 | 2.26 | 0.010 | 0.0335 (0.1) | 270 | 2 | Translucent pale yellowish viscous melt. |
| | | | | | 2–20 | No further increase in melt viscosity. The melt flowed down the side of the reactor when tipped. |
| 13 | 2.26 | 0.010 | $P_1$-t-Bu g (mmol) 0.0460 (0.1) | 270 | 2 | Translucent pale yellow non viscous melt. |
| | | | | | 7 | No chnge. |
| | | | | | 30 m–4 h | Slight darkening in color but no increase in viscosity. |
| 14 | 2.26 | 0.019 | 0.0230 (0.05) | 270 | 4 h | No apparent increase in melt viscosity. |

TABLE V(b)

Other Phosphazene Base Catalyzed ROP of $\epsilon$-Caprolactam

| Ex. No. | Yield g Before MeOH extraction | Yield g Poly./Olig. After Extraction with MeOH and then with water | % Conversion | $\eta$inh m-cresol/HFIP After MeOH extraction | PMT °C. Polymer | DSC $T_m$ °C. | DSC $\Delta H$ J/g |
|---|---|---|---|---|---|---|---|
| 9 | 2.22 | 0.60/1.30 | 27 | 0.79 | | 206, 220 | 99 |
| | | | | | | (1st cycle) 212, 219 | (1st cycle) 88 |

TABLE V(b)-continued

Other Phosphazene Base Catalyzed ROP of ε-Caprolactam

| Ex. No. | Yield g Before MeOH extraction | Yield g Poly./Olig. After Extraction with MeOH and then with water | % Conversion | ηinh m-cresol/HFIP After MeOH extraction | PMT °C. Polymer | DSC $T_m$ °C. | DSC $\Delta H$ J/g |
|---|---|---|---|---|---|---|---|
| 10 | 2.35 | 1.75/0.18 | 77 | 1.75/1.83 | | (2nd cycle) 219 (1st cycle) 217 | (2nd cycle) 67 (1st cycle) 77 |
| 11 | | | | | | | |
| 12 | 2.25 | 1.60/0.43 | 71 | 0.79/0.76 | | (2nd cycle) 221 (1st cycle) 218 (1st cycle) | (2nd cycle) 79 (1st cycle) 90 (2nd cycle) |
| 13 | | 0/1.58 | 0 | — | | | |
| 14 | 2.20 | 0/— | 0 | — | | | |

TABLE VI(a)

Phosphazene Base Catalyzed ROP of Nylon 66 Cyclic Unimer Dimer (94/6)

| Ex. No. | CU/CD (94/6) g | N-Acetyl caprolactam g | $P_4$-t-Bu (1M in hexane) mL = mmol | Hexanoic acid mL | Temp. °C. | Time min | Comments |
|---|---|---|---|---|---|---|---|
| 15 | 2.26 | — | 0.05 | — | 270 | 10 | The visc. had noticeably increased in the clear water white melt. However, a few dark patches were observed on the reactor wall above the melt. |
| | | | | | | 30 | The melt viscosity had increased but not to the point where the melt was climbing the stirrer. |
| | | | | | | 2 h | The pale yellow viscous melt was allowed to cool and solidify (see Example 15 for details on procedure). |
| 16 | 2.26 | 0.01 | 0.05 | — | 270 | 30 s | Clear melt starting to climb stirrer, lowered temperature to 260° C. |
| | | | | | | 5 | Raised stirrer from clear melt with bubbles. |
| | | | | | | 3 h | Clear melt had changed to expanded foam with a few dark spots above melt. |
| | | | | | | 4 h | Remained unchanged. Stopped heating. |
| 17 | 2.26 | 0.01 | $P_4$-t-Oct (1M in Hexane) g (mmol) 0.0336 g* (0.0362) *0.93 g = 1 mL | — | 270 | 2 | The reaction initiated and began to wrap around stirrer before the CU/CD was fully melted. Hand manipulation of the stirrer did result in melt down but this was not completely satisfactory due to the high melt viscosity. |
| | | | | | | 11 | Heating of the stringy melt was discontinued. |
| 18 | 2.26 | 0.01 | $P_4$-t-Oct 0.0168 (0.0181) | — | 270 | 25 | Melt was a thin and clear dark amber color. |
| | | | | | | 4 h | Melt was unchanged after 4 h. |

TABLE VI(b)

Phosphazene Base Catalyzed ROP of Nylon 66 Cyclic Unimer Dimer (94/6)

| Ex. No. | Yield g Before MeOH extraction | Yield g Poly./Olig. After extraction with MeOH and then with water | % Conversion | ηinh m-cresol/HFIP After MeOH extraction | PMT °C. Polymer | DSC $T_m$ °C. | DSC $\Delta H$ J/g |
|---|---|---|---|---|---|---|---|
| 15 | 2.25 | 1.66/— (calc.'d from the 1.87 g of product extracted) | 73 | 0.70/1.05 | 250 | 254 (1st cycle) 258 (2nd cycle) | 70 (1st cycle) 73 (2nd cycle) |
| 16 | 2.14 | 1.5/0.52 | 66 | 0.97/0.73 | | 259 (1st cycle) 258 (2nd cycle) | 63 (1st cycle) 68 (2nd cycle) |
| 17 | 2.29 | 1.28/1.07 | 57 | 1.73/1.48 | | | |
| 18 | 2.19 | 0.24/1.89 | 11 | 0.62/0.19 | | | |

What is claimed is:

1. A process for the ring opening polymerization of lactams that comprises contacting a lactam with a non-ionic polymerization base catalyst having a pKa of equal to or greater than 30 to form a polyamide.

2. A process as recited in claim 1 wherein the polymerization catalyst is a phosphazene base of the structure

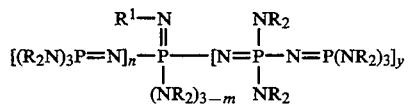

wherein $R^1$ is selected from the group consisting of $C_1$ to $C_8$ branched or linear alkyl;

R is selected from $CH_3$ or both R's together are —$(CH_2)_4$—; and m, n, and y are independently selected from the group consisting of the integers 0–3.

3. A process as recited in claim 2 wherein m is 2, n is 2 and y is 0.

4. A process as recited in claim 2 wherein m is 3, n is 3 and y is 0.

5. A process as recited in claim 2 wherein m is 3, n is 2 and y is 1.

6. A process as recited in claim 2 wherein m is 3, n is 1 and y is 2.

7. A process as recited in claim 2 wherein m is 1, n is 1 and y is 0.

8. A process as recited in claim 7 wherein the phosphazene base is $P_2$-Et.

9. A process as recited in claim 2 wherein m is 3, n is 0 and y is 3.

10. A process as recited in claim 4 wherein the phosphazene base is selected from the group consisting of $P_4$-t-Bu and $P_4$-t-Oct.

11. A process as recited in claim 9 wherein the phosphazene base is $P_4$-t-Bu.

12. A process as recited in claim 2 wherein the lactam is selected from the group consisting of $\epsilon$-caprolactam, enantholactam and nylon 66 cyclic unimer.

13. The process as recited in claim 12 wherein the lactam is $\epsilon$-caprolactam.

14. The process as recited in claim 12 wherein the lactam is nylon 66 cyclic unimer.

15. The process as recited in claim 12 wherein the lactam is enantholactam.

16. A process as recited in claim 2 wherein the polymerization takes place at a temperature of at least 150° C.

17. A process as recited in claim 16 wherein the polymerization takes place at a temperature of from 200° C. to 275° C.

18. A process as recited in claim 2 wherein the polymerization is conducted at a pressure of from 1–100 ATM.

19. A process as recited in claim 2 wherein the atmosphere is oxygen free and essentially moisture free.

20. A process according to claim 2 further comprising an effective amount of cocatalyst, N-acetyl-$\epsilon$-caprolactam.

21. A process for the ring opening polymerization of lactams that comprises contacting a mixture of lactams with a non-ionic polymerization base catalyst having a $pK_a$ of equal to or greater than 30 to form a copolyamide.

* * * * *